(12) United States Patent
Chen et al.

(10) Patent No.: US 11,563,909 B1
(45) Date of Patent: Jan. 24, 2023

(54) EVENT FILTERING IN AN EVENT SENSING SYSTEM

(71) Applicant: OMNIVISION TECHNOLOGIES, INC., Santa Clara, CA (US)

(72) Inventors: Shoushun Chen, Shanghai (CN); Menghan Guo, Shanghai (CN); Andreas Suess, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/402,297

(22) Filed: Aug. 13, 2021

(51) Int. Cl.
  *H04N 5/345* (2011.01)
  *H04N 5/369* (2011.01)
  *H04N 5/378* (2011.01)

(52) U.S. Cl.
  CPC ......... *H04N 5/3696* (2013.01); *H04N 5/3456* (2013.01); *H04N 5/3692* (2013.01); *H04N 5/378* (2013.01); *H04N 5/3454* (2013.01)

(58) Field of Classification Search
  CPC ........................... H04N 5/3454; H04N 5/3456
  USPC ........................................................ 348/294
  See application file for complete search history.

(56) References Cited

FOREIGN PATENT DOCUMENTS

| EP | 3506622 A1 * | 7/2019 | ............ G06K 9/0063 |
| WO | WO-2020166457 A1 * | 8/2020 | ............ H04N 5/347 |
| WO | WO-2020170861 A1 * | 8/2020 | ............ H04N 5/341 |
| WO | WO-2021001760 A1 * | 1/2021 | ............ H04N 5/341 |

* cited by examiner

*Primary Examiner* — Anthony J Daniels
(74) *Attorney, Agent, or Firm* — Perkins Coie LLP

(57) ABSTRACT

An event sensing system includes a pixel array including a plurality of event driven pixel circuits configured to be illuminated by incident light. The event driven pixel circuits are configured to generate an event current in response to a detection of an event in the incident light. Output signals of a row of the pixel array are configured to be read out from the row of the pixel array to a line buffer in response to the detection of the event in the incident light. A random number generator is configured to randomly generate a filtering mask. A mask circuit is the output signals of the row of the pixel array from the line buffer and the filtering mask from the random number generator to filter the output signals of the row of the pixel array in response to the filtering mask.

35 Claims, 4 Drawing Sheets

EVENT FILTERING IN AN EVENT SENSING SYSTEM

BACKGROUND INFORMATION

Field of the Disclosure

This disclosure relates generally to event driven sensors, and in particular but not exclusively, relates to filtering in event sensing systems.

Background

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
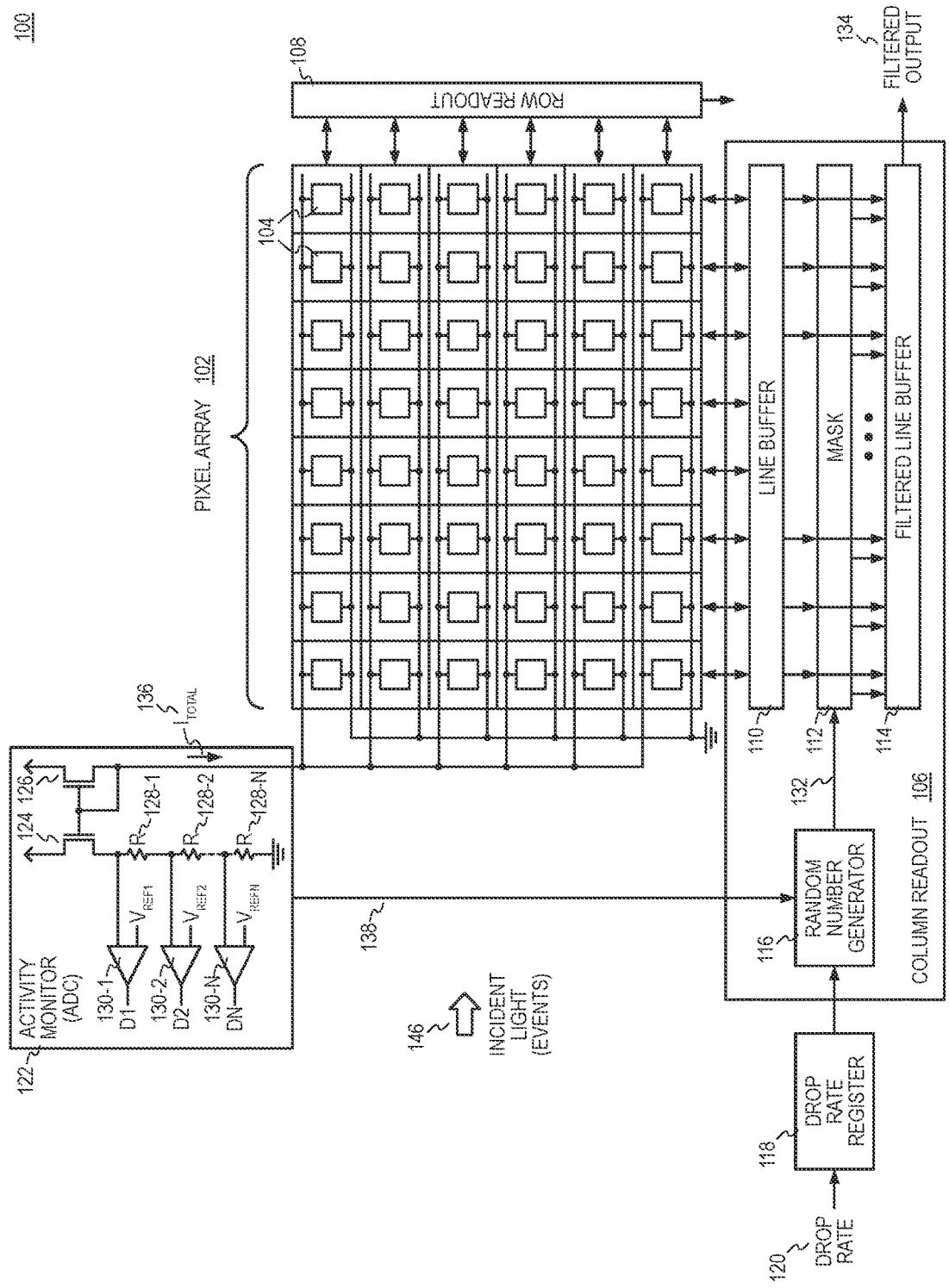
FIG. 1 is a block diagram illustrating one example of an event sensing system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Various examples directed to an event sensing system with event filtering are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship relative to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Although traditional image/video sensors offer great image and/or video capturing capabilities, one of the limitations with traditional image/video sensors is that it is difficult for normal image/video sensors to provide ultra-high frame rates and ultra-high speed capture capabilities that may be useful in a variety of applications such as machine vision, gaming, artificial intelligence sensing, etc. Usually, traditional image/video sensors utilize active pixel sensors, which require certain amounts of exposure times in order to integrate small photocurrents, and then output the image data in image frames in the acquisition order. In order to capture high speed motion, the active pixel sensors have to run at very high frame rates. This results in massive quantities of data output by the traditional active pixel sensors. This output data usually contains a very high level of redundancy from frame to frame, much of which may be used to convey the same static or slow-changing background of the field of view. In other words, large amounts of background information are constantly sampled, re-sampled, output, and then reprocessed with traditional active pixel sensors. Attempts to provide typical image/video sensors to with such ultra-high frame rates and ultra-high speed capabilities have resulted in compromised solutions that provide poor quality image/video captures compared to their normal image/video sensor counterparts.

As will be shown, various examples of an event sensing systems with event filtering are disclosed. Event sensing systems are event driven sensors, which are also known as event vision sensors (EVS) or dynamic vision sensors (DVS). In the various examples, the event sensing systems include pixel arrays of event driven pixels. An event driven pixel detects events asynchronously on a pixel level without the need for capturing an entire frame with a very high level of redundancy. This enables the event driven pixel to detect events with ultra-high frame rates and ultra-high speed capabilities.

Each event driven pixel in an event vision sensor can continuously monitor the relative change in light intensity and fire an event if a threshold is reached. The event information usually is in the format of (X, Y, P, T), where (X,Y) is the pixel's address in the pixel array, (P) denotes the polarity of the light change, and (T) is the time stamp. One of the key advantages of an event vision system compared to a CMOS image sensor (CIS) is the possible latency reduction as event driven pixels without an output signal change do not contribute to readout bandwidth consumption.

Event driven sensors read out event driven pixels through arbitration, or a scanning operation, or a hybrid thereof. In cases in which there are numerous event driven pixel trigger events at roughly the same time, collisions can occur, and the peripheral circuitry may need to arbitrate in order to decide how to read out the colliding event driven pixels efficiently considering multiple factors including latency, power consumption, data-rate, etc.

Due to the asynchronous nature of the ultra-high speed capabilities, event driven pixels include a time stamp in order to maintain the correct sequence of events for the asynchronously detected events. Generally, there are two ways of assigning time stamp to the events. In a first method, which may be referred to as an "in-pixel time stamp," each pixel is built with a digital/analog storage circuit to sample and hold cyclic timer (Tc) information when the pixel is fired. In a second method, which may be referred to as an "off-pixel time stamp," the time a pixel is selected for readout is used as the time stamp.

Thus, in-pixel time stamping allows for better timing accuracy as simultaneously occurring events can be accurately represented with the same time stamp included in the event information of the pixel readout. However, the built in digital/analog storage circuits included in order to implement in-pixel time stamping are an expense that results in increased pixel size, complexity, and somewhat reduced scalability. In comparison, off-pixel time stamping allows for less pixel complexity since built in digital/analog storage circuits are not required, but at the expense of increased time stamp errors especially during the occurrence of high event rate collisions and congestion. For instance, simultaneously occurring events are nevertheless read out sequentially with off-pixel time stamping, which therefore causes sequential time stamps for the simultaneously occurring events. If the latency of the off-pixel stamping operations causes time stamp errors that are longer than the time cycle time, or the encoded time stamp time, a timer overflow error can occur.

As will be shown, example event sensing systems in accordance with the teachings of the present invention include various mechanisms that avoid time stamp errors by randomly dropping events. In the various examples, an event sensing system includes an event filtering mechanism to avoid congestion at excess event-rates. The mechanism employs a randomly generated mask to select which events are to be filtered out such as to avoid static artifacts.

To illustrate, FIG. 1 is a block diagram illustrating one example of an event sensing system 100 in accordance with the teachings of the present invention. Event sensing system 100 includes a pixel array 102 of event driven pixel circuits 104 that are configured to photogenerate charge or photocurrent in response to incident light 146. In the depicted example, the pixel array 102 is configured to be illuminated with incident light 146, which may be received from an external scene in which an event occurs. Events are indicated in the incident light 146 with quick or sudden changes in luminosity in incident light 146. In the example, the pixel array 102 is a two-dimensional (2D) array with event driven pixel circuits 104 arranged into rows and columns as shown. After each event driven pixel circuit 104 has been exposed to incident light and generated charge or photocurrent in response, a corresponding output signal is read out by a column readout circuit 106 if an event is detected as shown. In the various examples, the output signals may be read out if and only if an event is detected from each row of pixel array 102, which may be read out in parallel through column bit lines by column readout circuit 106 as shown.

In one example, event sensing system 100 also includes a row readout circuit 108 coupled to the rows of pixel array 102. In various examples, row readout circuit 108 may be configured to detect whether at least one of the event driven pixel circuits 104 in a row of pixel array 102 has detected an event. In various examples, column readout circuit 106 may also be configured to detect whether at least one of the event driven pixel circuits 104 in a column of pixel array 102 has detected an event. In one example, the event driven pixel circuits 104 may be read out using an open drain readout technique.

As shown in the depicted example, column readout circuit 106 includes a line buffer 110, which is coupled to pixel array 102 to read out all of the output signals generated by the event driven pixel circuits 104 of pixel array 102 in response to the detection of events in the incident light 146. As will be shown, the event sensing system 100 is configured to reduce time stamp errors by randomly dropping events in accordance with the teachings of the present invention. In the various examples, events may be dropped randomly by event sensing system 100 according to several factors.

For instance, one factor utilized by the example event sensing system 100 illustrated in FIG. 1 to randomly drop events is a row-based random drop, which is implemented with a random number generator 116 included in column readout circuit 106. In the example, the random number generator 116 is configured to generate random numbers, which are used to provide a filtering mask 132 to randomly select events to drop. In the example, the random number generator 116 is programmable and has a multitude of programmable filtering ratios which are selected based on inputs to the random number generator 116. The random number produced by random number generator 116 is configured to generate a filtering mask 132, which is coupled to be received by a mask circuit 112 as shown.

In the example, the mask circuit 112 is also coupled to line buffer 110 to receive the output signals generated by the event driven pixel circuits 104 of pixel array 102 in response to the detection of events in the incident light 146. The illustrated example also illustrates that an event filtering rate or a drop rate 120 is then applied to each readout, such as for example in a row-based manner. In particular, the illustrated example shows that the drop rate 120 is input into a drop rate register 118. The drop rate 120 is then coupled to be received by the random number generator 116 from drop rate register 118. In one example, the drop rate 120 may be coupled to be received by drop rate register 118 through a communications bus, via for example an I2C communication protocol, an SPI communication protocol, etc.

In the example, the random number generator 116 is configured to generate a random number that is utilized to produce the filtering mask 132, which is coupled to be received by mask circuit 112. The random number generated by random number generator 116 determines the rate at which events are dropped or filtered in response to the drop rate 120. As such, the detected events indicated in the output signals generated by the by the event driven pixel circuits 104 of pixel array 102 in response to the incident light 146 are randomly dropped or omitted at an event filtering rate in response to the drop rate 120. The randomly filtered, dropped, or omitted events are therefore randomly removed, which limits their contribution to bandwidth and latency in accordance with the teachings of the present invention.

Thus, in operation, the mask circuit 112 is configured to mask the output signals that are received from line buffer 110 in response to the filtering mask 132 received from random number generator 116. The event filtering rate at which the events from line buffer 110 are randomly filtered is responsive to the drop rate 120 in accordance with the teachings of the present invention. In the example, the masked output of mask circuit 112 is coupled to be received by filtered line buffer 114, which is configured to output filtered output 134 in accordance with the teachings of the present invention. In one example, the filtered line buffer 114 is coupled to receive the output of a logical AND operation of the filtering mask 132 received from random number generator 116 and the contents of the line buffer 110 received from pixel array 102.

It is appreciated that mask circuit 112 depicted in the example shown in FIG. 1 utilizes the row-based random filtering mask 132 provided with random number generator 116 to generate filtered output 134 from filtered line buffer 114 in order to avoid fixed pattern artifacts. In the various examples, this row-based filtering mask 132 may be generated at every readout from pixel array 102 in order to avoid a situation in which the same event driven pixel circuits 104 are constantly hindered from contributing events, which would cause fixed pattern artifacts in the filtered output 134 from the filtered line buffer 114.

In various examples, the random number generator 116 may be implemented with a pseudo-random code generator, such as for example a linear feedback shift register. As mentioned, the example random number generator 116 is programmable and has a multitude of programmable filtering ratios which are selected from based on inputs of the random number generator 116. For instance, in one example the random number generated by random number generator 116 is responsive to the drop rate 120 received from drop rate register 218 to control or adjust the event filtering rate or drop rate. As such, in the various examples, it is appreciated that the filtering mask 132 provided with the random number generated by random number generator 116 naturally implements an upper limit for the maximum event rate at which events are dropped from the filtered output 134 in response to drop rate 120. As such, the bandwidth and latency of detected events are controlled so as not to exceed predefined bounds imposed in response to the drop rate 120 in accordance with the teachings of the present invention.

In various examples, if each row of pixel array 102 includes N columns of event driven pixel circuits 104, the digital random number generator 116 for generating the filtering mask 132 may be configured to generate N random numbers for each event driven pixel circuit 104 of each row to realize truly random filtering. In other examples, the length of the filtering mask 132 may have the length M that is shorter than the column count N, or M<N, which may allow for easier implementation. In an example where the length of the filtering mask 132 is M, and M<N, the shorter filtering mask 132 may be either generated locally per block to be filtered or globally in which case the global filtering mask 132 may be repeated/copied/applied periodically in order to limit the burden on the random number generator 116.

Another factor that may be utilized by the example event sensing system 100 as illustrated in FIG. 1 is implemented with an activity monitor 122, which is coupled to pixel array 102 and column readout circuit 106 as shown. In the example, each event driven pixel circuit 104 of pixel array 102 is configured to contribute a unit current having a predetermined value when the event driven pixel circuit 104 is fired. In the depicted example, unit currents from all of the event driven pixel circuits 104 of pixel array 102 are summed and into a total current $I_{TOTAL}$ 136. As such, the example activity monitor 122 illustrated in FIG. 1 is a global activity monitor that is configured to monitor the total current $I_{TOTAL}$ 136, which is representative of the total number of event driven pixel circuits 104 that are being fired in pixel array 102. In one example, it is appreciated that activity monitor 122 is implemented in a way such that every event driven pixel circuit 104 generates a distinct current consumption having a predetermined value on a reference supply if and only if an event is detected by the respective event driven pixel circuit 104. As such, the total current $I_{TOTAL}$ 136, which is the sum of the distinct current consumptions by the event driven pixel circuits 104, may be measured on the reference supply with an analog to digital converter (ADC) included in activity monitor 122.

As shown in the example, the activity monitor 122 is configured to monitor the total current $I_{TOTAL}$ 136 through the event driven pixel circuits 104 of pixel array 102 that have detected events, which can then be compared to a certain threshold. As shown, activity monitor 122 therefore generates an activity monitor signal 138 in response to the event activity monitored from the event driven pixel circuits 104 of pixel array 102. In the example, the activity monitor signal 138 is also coupled to be received by random number generator 116 to further program the random number generator 116 to select among the multitude of programmable filtering ratios implemented therein. In the example, the random number generated by random number generator 116 is therefore further configured to be responsive to the activity monitor signal 138 to further control the event filtering rate or drop rate. As such, a predefined event filtering rate can be selected in further response to the total current $I_{TOTAL}$ 136 in order to guarantee a desired latency in filtered output 134 in accordance with the teachings of the present invention.

In the example depicted in FIG. 1, activity monitor 122 includes an analog to digital converter (ADC) that is implemented with a current mirror that includes a first transistor 124 and a second transistor 126 as shown. In the example depicted in FIG. 1, the drains of first and second transistors 124 and 126 are coupled to a supply voltage, and the gates of first and second transistors 124 and 126 are coupled together and to the source of transistor 126. The source of transistor 126 is coupled to conduct the total current $I_{TOTAL}$ 136, which is also coupled to all of the event driven pixel circuits 104 of pixel array 102 as shown. The source of transistor 124 is coupled to a voltage divider that includes a plurality of resistors 128-1, 128-2, . . . 128-N that are coupled in series. Each one of the plurality of resistors 128-1, 128-2, . . . 128-N is coupled to a respective one of a plurality of comparators 130-1, 130-2, . . . 130-N. Each one of the plurality of comparators 130-1, 130-2, . . . 130-N is also coupled to a respective reference voltage $V_{REF1}$, $V_{REF2}$, . . . $V_{REFN}$ to generate a respective digital output signals D1, D2, . . . DN as shown. In the example, it is appreciated that the digital output signals provided with D1, D2, . . . DN is a digital temperature code representative of the total current $I_{TOTAL}$ 136. In other examples, it is appreciated that the activity monitor 122 may be implemented with other types of analog to digital converters. In the example, the output of activity monitor 122 is configured to generate an activity monitor signal 138 responsive to digital output signals D1, D2, . . . DN that is coupled to be received by the random number generator 116 of column readout circuit 106.

In operation, it is appreciated that the current mirror included in example activity monitor 122 illustrated in FIG. 1 mirrors the total current $I_{TOTAL}$ 136 into the current path that includes the voltage divider provided with the plurality of resistors 128-1, 128-2, . . . 128-N. The mirrored current through the plurality of resistors 128-1, 128-2, . . . 128-N generates corresponding voltage drops across each one of the plurality of resistors 128-1, 128-2, . . . 128-N, which generate the digital output signals D1, D2, . . . DN at the outputs of plurality of comparators 130-1, 130-2, . . . 130-N, depending on whether the respective reference voltages $V_{REF1}$, $V_{REF2}$, . . . $V_{REFN}$ are exceeded.

In other examples, it is appreciated that activity monitor 122 may implemented so as to directly operate on the total current $I_{TOTAL}$ 136. As such, it is appreciated that other analog to digital circuit configurations (e.g., ramp slope, SAR, sigma-delta, etc.) may be implemented in activity monitor 122 depending on latency/power/area/accuracy/performance/etc. requirements.

Figure 2:
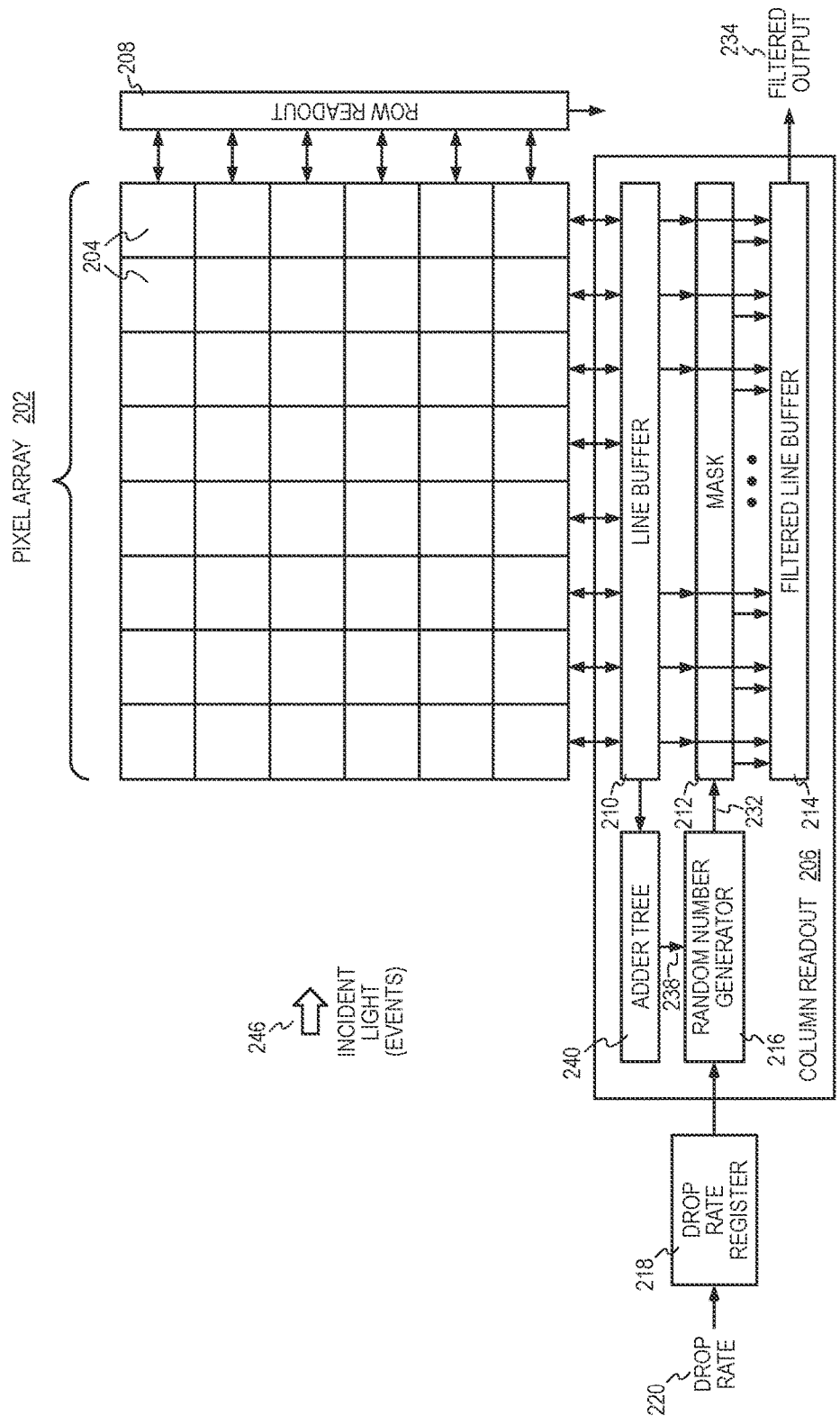
FIG. 2 is a block diagram illustrating another example of an event sensing system in accordance with the teachings of the present invention.

FIG. 2 is a block diagram illustrating another example of an event sensing system 200 in accordance with the teachings of the present invention. It is appreciated the event sensing system 200 of FIG. 2 may be another example of the event sensing system 100 as shown in FIG. 1, and that similarly named and numbered elements described above are coupled and function similarly below. It is further appreciated that the event sensing system 200 of FIG. 2 shares many similarities with the event sensing system 100 described in detail in FIG. 1.

For instance, as shown in the example depicted in FIG. 2, event sensing system 200 also includes a pixel array 202 of event driven pixel circuits 204 that are configured to photogenerate charge or photocurrent in response to incident light 246. In the depicted example, the pixel array 202 is configured to be illuminated with incident light 246, which may be received from a scene in which an event occurs. Events are indicated with quick or sudden changes in luminosity in incident light 246. In the example, the pixel array 202 is a two-dimensional (2D) array with event driven pixel circuits 204 arranged into rows and columns as shown. After each event driven pixel circuit 204 has been exposed to incident light 246 and generated charge or photocurrent in response, a corresponding output signal is read out by a column readout circuit 206 as shown. In the various examples, the output signals may be read out if an event is detected from each row of pixel array 202, which may be read out in parallel through column bit lines by column readout circuit 206 as shown.

In one example, event sensing system 200 also includes a row readout circuit 208 coupled to the rows of pixel array 202. In various examples, row readout circuit 208 may be configured to detect whether at least one of the event driven pixel circuits 204 in a row of pixel array 202 has detected an event. In various examples, column readout circuit 206 may also be configured to detect whether at least one of the event driven pixel circuits 204 in a column of pixel array 202 has detected an event. In one example, the event driven pixel circuits 204 may be read out using an open drain readout technique.

As shown in the depicted example, column readout circuit 206 includes a line buffer 210, which is coupled to pixel array 202 to read out all of the output signals generated by the event driven pixel circuits 204 of pixel array 202 in response to the detection of events in the incident light 246. As will be shown, the event sensing system 200 is configured to reduce time stamp errors by randomly dropping events in accordance with the teachings of the present invention. In the various examples, events may be dropped randomly by event sensing system 200 according to several factors.

For instance, one factor utilized by the example event sensing system 200 illustrated in FIG. 2 to randomly drop events is a row-based random drop, which is implemented with a random number generator 216 included in column readout circuit 206. In the example, the random number generator 216 is configured to generate random numbers, which are used to provide a filtering mask 232 to randomly select events to drop. In the example, the random number generator 216 is programmable and has a multitude of programmable filtering ratios which are selected from based on inputs to the random number generator 216. The random number produced by random number generator 216 is configured to generate a filtering mask 232, which is coupled to be received by a mask circuit 212 as shown.

In the example, the mask circuit 212 is also coupled to line buffer 210 to receive the output signals generated by the event driven pixel circuits 204 of pixel array 202 in response to the detection of events in the incident light 246. The illustrated example also illustrates that an event filtering rate or a drop rate 220 is then applied to each readout, such as for example in a row-based manner. In particular, the illustrated example shows that the drop rate 220 is input into a drop rate register 218. The drop rate 220 is then coupled to be received by the random number generator 216 from drop rate register 218. In one example, the drop rate 220 may be coupled to be received by drop rate register 218 through a communications bus, via for example an I2C communication protocol, an SPI communication protocol, etc.

In the example, the random number generator 216 is configured to generate a random number that is utilized to produce the filtering mask 232, which is coupled to be received by mask circuit 212. The random number generated by random number generator 216 determines the rate at which events are dropped or filtered in response to the drop rate 220. As such, the detected events indicated in the output signals generated by the by the event driven pixel circuits 204 of pixel array 202 in response to the incident light 246 are randomly dropped or omitted at an event filtering rate in response to the drop rate 220. The randomly filtered, dropped, or omitted events are therefore randomly removed, which limits their contribution to bandwidth and latency in accordance with the teachings of the present invention.

Thus, in operation, the mask circuit 212 is configured to mask the output signals that are received from line buffer 210 in response to the filtering mask 232 received from random number generator 216. The event filtering rate at which the events from line buffer 210 are randomly filtered is responsive to the drop rate 220 in accordance with the teachings of the present invention. In the example, the masked output of mask circuit 212 is coupled to be received by filtered line buffer 214, which is configured to output filtered output 234 in accordance with the teachings of the present invention. In one example, the filtered line buffer 214 is coupled to receive the output of a logical AND operation of the filtering mask 232 received from random number generator 216 and the contents of the line buffer 210 received from pixel array 202.

It is appreciated that mask circuit 212 depicted in the example shown in FIG. 2 utilizes the row-based random filtering mask 232 provided with random number generator 216 to generate filtered output 234 from filtered line buffer 214 in order to avoid fixed pattern artifacts. In the various examples, this row-based filtering mask 232 may be generated at every readout from pixel array 202 in order to avoid a situation in which the same event driven pixel circuits 204 are constantly hindered from contributing events, which would cause fixed pattern artifacts in the filtered output 234 from the filtered line buffer 214.

In various examples, the random number generator 216 may be implemented with a pseudo-random code generator, such as for example a linear feedback shift register. As mentioned, the example random number generator 216 is programmable and has a multitude of programmable filtering ratios which are selected from based on inputs of the random number generator 216. For instance, in one example the random number generated by random number generator 216 is responsive to the drop rate 220 received from drop rate register 218 to control or adjust the event filtering rate or drop rate. As such, in the various examples, it is appreciated that the filtering mask 232 provided with the random number generated by random number generator 216 naturally implements an upper limit for the maximum event rate at which events are dropped from the filtered output 234 in response to drop rate 220. As such, the bandwidth and latency of detected events are controlled so as not to exceed predefined bounds imposed in response to the drop rate 220 in accordance with the teachings of the present invention.

In various examples, if each row of pixel array 202 includes N columns of event driven pixel circuits 204, the digital random number generator 216 for generating the filtering mask 232 may be configured to generate N random numbers for each event driven pixel circuit 204 of each row to realize truly random filtering. In other examples, the length of the filtering mask 132 may have the length M that is shorter than the column count N, or M<N, which may allow for easier implementation. In an example where the length of the filtering mask 232 is M, and M<N, the shorter filtering mask 232 may be either generated locally per block, or applied periodically to the blocks in order to limit the burden on the random number generator 216.

One of the differences between the example event sensing system 200 shown FIG. 2 and the event sensing system 100 shown in FIG. 1 is that in the example event sensing system 200 shown FIG. 2, instead of using a global activity monitor 122 to globally monitor all of the pixel circuits 104 of pixel array 102 for event activity as described in FIG. 1, a row-based activity monitor is implemented in row readout circuit 208 instead as shown in FIG. 2. In operation, the adder tree 240 is configured to sample information in line buffer 210 if events are detected in a row of pixel array 202 by the row readout circuit 208. In various examples, a row-event rate monitor included in row readout circuit 208 may be implemented with current-starved bit-keepers included in the event driven pixel circuits 204. In various examples, the output signals from the event driven pixel circuits 204 of an entire row of pixel array 202 may be optionally copied to line buffer 210 when an event is detected by row readout circuit 208, and then the filtering mask 212 may then be applied.

In another example, it is appreciated that a combination of a global activity monitor, such as described for example in FIG. 1, and/or a row/column-wise activity monitor, such as described for example in FIG. 2, may be utilized to measure event activity in pixel array 102 or in pixel array 202 in accordance with the teachings of the present invention. In an example with a combination of row/column-wise activity monitor and a global activity monitor, it is appreciated that events are filtered using the randomly generated mask 232 if and only if both the global activity monitor and the row/column activity monitors detect an excess activity in the pixel array 202.

In one example, adder tree 240 may be implemented to generate a digital activity monitor signal 238 directly by boolean logic gates coupled output latches of the line buffer 210 to monitor the event activity. In the example, a local row or block-wise activity measure is derived by adder tree 240 from the line buffer 210. For instance, the adder tree 240 example shown in FIG. 2 may utilize adders or the generation of unit currents having the predetermined values by the event driven pixel circuits 204 in response to the detection events as well as analog to digital conversion. Therefore, instead of measuring unit currents with an ADC as shown for example in FIG. 1, the adder tree 240 example shown in FIG. 2 exploits the fact that the line buffer 210 already stores the events found for example in a row/column for further filtering and/or encoding. This "storing" may be implemented in for example flip-flops or latches whose outputs are representative of whether there is an event. Summing them up hence, yields a measure of activity. Hence, adders in the adder tree 240 may be used to calculate the sum. Thus, instead of wiring all of the columns (e.g., 1024 columns) of pixel array 202 to one big adder, two neighboring cells may be added together, whose sum may then be added with the sum of the neighboring two cells, and so on, in adder tree 240. As such, a calculation of the sum by adder tree 240 can yield a much simpler design in accordance with the teachings of the present invention.

In one example, the random number generator 216 is further coupled to receive the digital activity monitor signal 238 to generate filtering mask 232. In various other examples, it is appreciated that block-wise activity signals may be implemented using adder tree 240 to implement and incorporate block filtering masks instead of a row mask to filter events from pixel array 202 in accordance with the teachings of the present invention.

Figure 3:
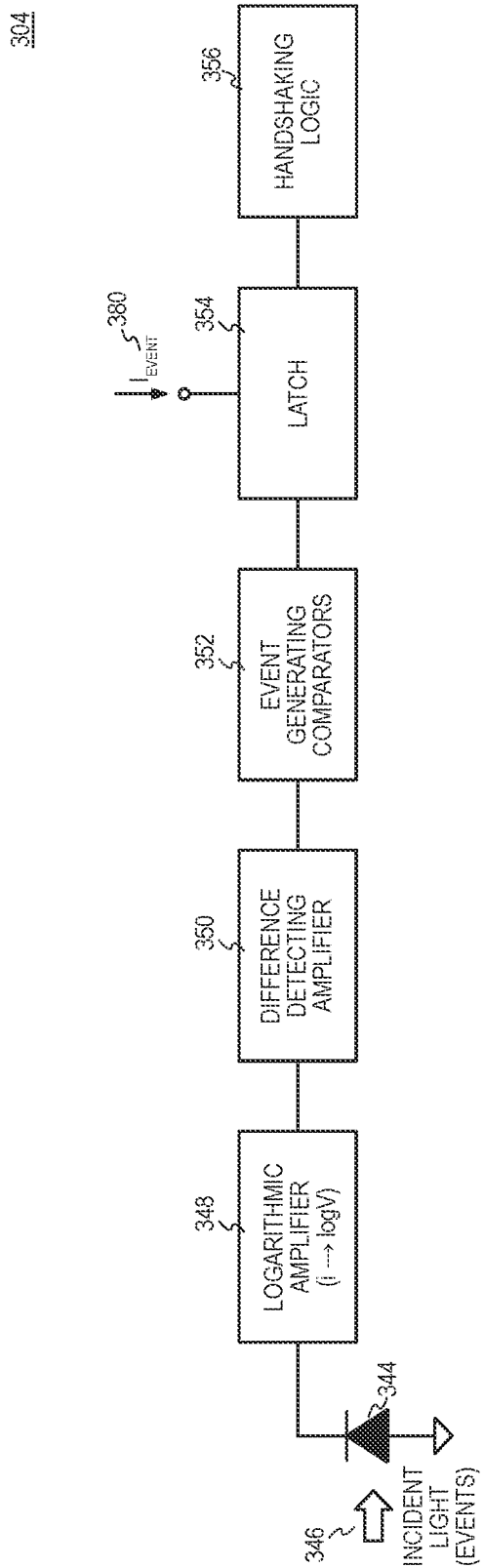
FIG. 3 is a block diagram illustrating one example of an event driven pixel in accordance with the teachings of the present invention.

FIG. 3 is a block diagram illustrating one example of an event driven pixel circuit 304 in accordance with the teachings of the present invention. It is appreciated the event driven pixel circuit 304 of FIG. 3 may be a block diagram example of the one of the event driven pixel circuits 204 of FIG. 2, or a block diagram example of the one of the event driven pixel circuits 104 of FIG. 1, or and that similarly named and numbered elements described and that similarly named and numbered elements described above are coupled and function similarly below.

As shown in the example depicted in FIG. 3, event driven pixel circuit 304 includes a photodiode 344 configured to photogenerate charge or photocurrent in response to incident light 346 received from an external scene. A logarithmic amplifier 348 is coupled to the photodiode 344, which is configured to convert photocurrent generated by the photodiode 344 to a voltage. In various examples, the logarithmic amplifier 348 is configured to generate the voltage by transducing the momentary photocurrent from photodiode 344. A difference detecting amplifier 350 is coupled to the logarithmic amplifier 348 to generate a filtered and amplified signal in response to differences that are detected in the voltage received from the logarithmic amplifier 348. In one example, the difference detecting amplifier 350 is configured to compare the momentary log-intensity of the voltage output of the logarithmic amplifier 348 with a reference level based on a reset condition or a last event. Event generating comparators 352 are coupled to the difference detecting amplifier 350 to compare the filtered and amplified signal received from the difference detecting amplifier 350 with thresholds to asynchronously detect events that occur in the external scene in response to the incident light 346. In one example, the event generating comparators 352 are configured to discriminate if said signal difference is significant enough to trigger an event. Latch 354 is coupled to the event generating comparators 352 to store the events detected by the event generating comparators 352 until they can be read by handshaking logic 356 to interface with the peripheral circuitry. In the depicted example, it is noted that the example latch 354 includes a $V_{DD\text{-}SENSE}$ terminal through which latch 354 can be sensed. In one example, an event current $I_{EVENT}$ 380 is a distinct current consumption (e.g, a unit current) that is conducted through latch 354 in response to an event being detected in event driven pixel circuit 304. In one example, the event current $I_{EVENT}$ 380 is conducted through latch 354 if and only if an event is detected in event driven pixel circuit 304. As will be described in greater detail below, in one example, the event current $I_{EVENT}$ 380 is a unit current and may have a predetermined value.

In operation, when an event occurs in an external scene, that event is indicated in the incident light 346 that is received by photodiode 344 as a quick or sudden change in intensity or brightness. In other words, if the external scene is static, and thus there is no event occurring, the brightness of incident light 346 remains substantially unchanged. As such, the photocurrent generated by photodiode 344 remains substantially constant. However, if an event occurs (e.g., movement, etc.) in the external scene, the event is indicated with an asynchronous quick or sudden change in the brightness of incident light 346. The change in brightness can be from darker to brighter or from brighter to darker. As such, there is an asynchronous change or delta in the photocurrent generated by photodiode 344. The change or delta in the photocurrent is converted to a voltage by logarithmic amplifier 348, filtered and amplified by difference detecting amplifier 350, and then detected with the event generating comparators 352. The events are latched in latch 354 until they can be read out by handshaking logic 356.

It is appreciated therefore that event driven pixel circuit 304 does not need to record an entire regular image, and therefore is not burdened with having to capture all of the highly redundant information of a normal image from frame to frame. Instead, in various examples, the event driven pixel circuit 304 only records the location of where an event is detected (e.g., the x-y coordinates of photodiode 344 in a pixel array where the event was detected), the polarity of change in the photocurrent for that event (e.g., brighter or darker), and a time stamp of when that event occurred. In other words, event driven pixel circuit 304 only needs to detect movement or motion, not entire frames of images/video, thereby requiring only a low data rate enabling ultra-high frame rates and ultra-high speed capabilities. In various examples, the event data from the event driven pixel circuit 304 may be combined with a normal image or video capture to reconstruct a high frame rate, high quality image or video with event detection via software, an artificial intelligence (AI) network, etc., in accordance with the teachings of the present invention.

Figure 4:
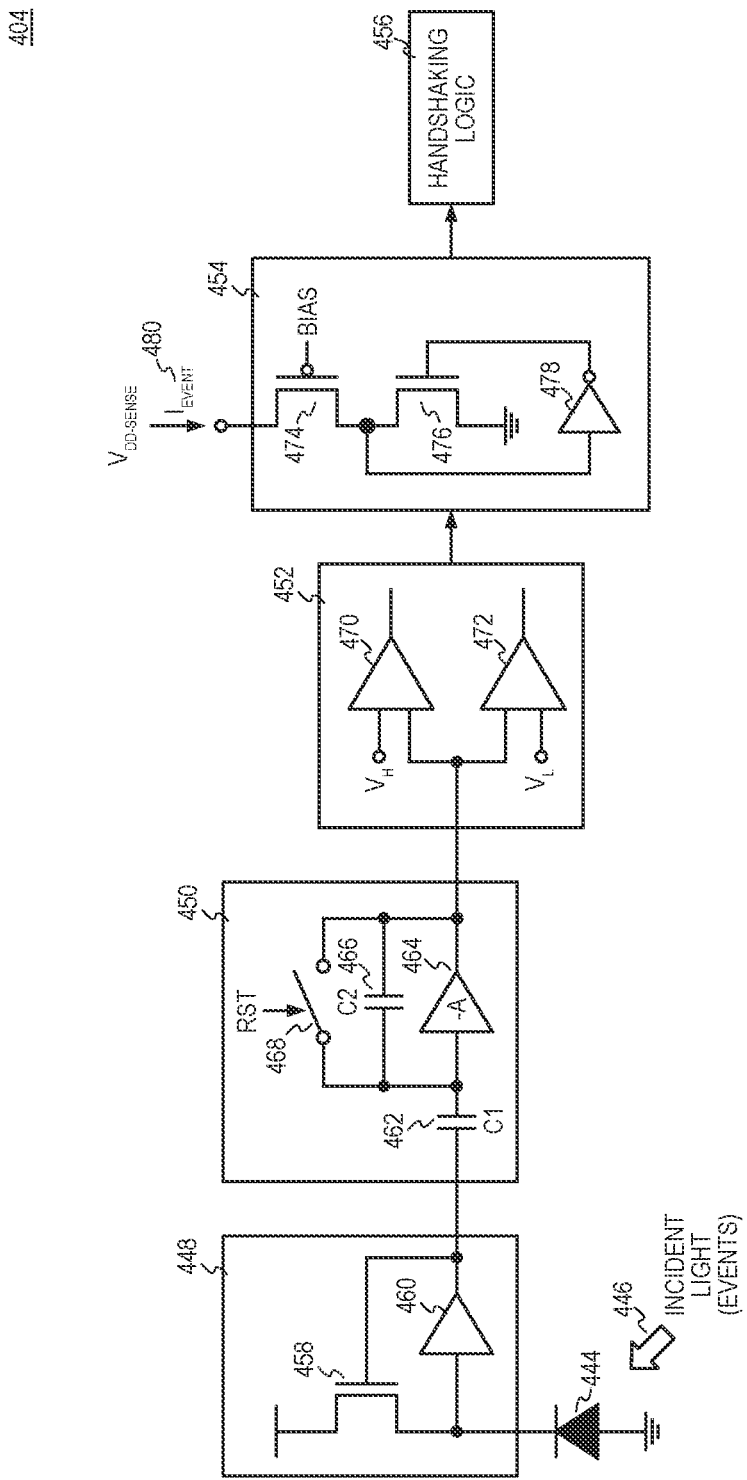
FIG. 4 illustrates a schematic of one example of an event driven pixel in accordance with the teachings of the present invention.

FIG. 4 illustrates a schematic of one example of an event driven pixel 404 in accordance with the teachings of the present invention. It is appreciated the event driven pixel circuit 404 of FIG. 4 may be a schematic diagram example of the block diagram example of the event driven pixel circuits 304 of FIG. 3, or may be a schematic diagram example of the one of the event driven pixel circuits 204 of FIG. 2, or a schematic diagram example of the one of the event driven pixel circuits 104 of FIG. 1, or and that similarly named and numbered elements described and that similarly named and numbered elements described above are coupled and function similarly below.

As shown in the example depicted in FIG. 4, event driven pixel circuit 404 includes a photodiode 444 configured to photogenerate charge or photocurrent in response to incident light 446 received from an external scene. A logarithmic amplifier 448 is coupled to the photodiode 444, which is configured to transduce the momentary photocurrent from photodiode 444 into a voltage. In the depicted example, the logarithmic amplifier 448 includes an amplifier 460 having an input coupled to the photodiode 444 and a transistor 458 having a source coupled to the photodiode 444 and to the input of the amplifier 460. As shown, transistor 458 also has a gate coupled to an output of the amplifier 460, and a drain coupled to a supply voltage. In other examples, it is appreciated that logarithmic amplifier 448 may have other schematic configurations that provide an output voltage that is logarithmically related to the intensity of the incident light 446 received from the external scene in accordance with the teachings of the present invention.

Continuing with the depicted example, a difference detecting amplifier 450 is coupled to the logarithmic amplifier 448 to compare the momentary log-intensity of the voltage output of the logarithmic amplifier 448 with a reference level based on a reset condition or a last event. In the depicted example, the difference detecting amplifier 450 provides a high pass filter that is configured to filter out lower frequency components from the voltage received from the logarithmic amplifier 448. In so doing, the event driven pixel circuit 404 is configured to ignore slow or gradual changes in the photocurrent and instead detect quick or sudden changes that occur in the photocurrent generated by the photodiode 444.

In the depicted example, the difference detecting amplifier 450 includes an amplifier 464 having a gain of −A. A first capacitor C1 462 is coupled between an output of the logarithmic amplifier 448 and an input of amplifier 464. A second capacitor C2 466 is coupled between the input of the amplifier 464 and the output of the amplifier 464. A reset switch 468 is also coupled between the input of the amplifier 464 and the output of the amplifier 464. In other examples, it is appreciated that difference detecting amplifier 450 may have other schematic configurations that compare the momentary log-intensity of the voltage output of the logarithmic amplifier 448 with a reference level based on a reset condition or a last event in accordance with the teachings of the present invention.

The example depicted in FIG. 4 shows that event generator comparators 452 are coupled to the difference detecting amplifier 450 to to compare the signal received from the difference detecting amplifier 450 with thresholds (e.g., $V_H$ and $V_L$) to asynchronously detect events that occur in the external scene in response to the incident light 446. In the depicted example, event generating comparators 452 includes a first comparator 470 having a first input coupled to receive a high threshold value (e.g., $V_H$) and a second input coupled to receive the output signal from the difference detecting amplifier 450. Event generating comparators 452 also includes a second comparator 472 having a first input coupled to receive a low threshold value (e.g., $V_L$) and a second input coupled to receive the output signal from the difference detecting amplifier 450. In one example, the first comparator 470 may be triggered when the brightness or intensity of the incident light 446 changes in one direction (e.g., darker to brighter) and the second comparator 472 may be triggered when the brightness or intensity of the incident light 446 changes in the other direction (e.g., brighter to darker), or vice-versa.

As shown in the depicted example, a latch 454 is coupled to receive the event generator comparators 452 to store the events detected by event generator comparators 452 until they can be read by handshaking logic 456. The example latch 454 illustrated in FIG. 4 includes a first transistor 474, a second transistor 476, and an inverter 478. In the example, first transistor 474 is a PMOS transistor and second transistor 476 is an NMOS transistor. A first terminal of first transistor 474 is coupled to a first terminal of second transistor 476. A second terminal of first transistor 474 is coupled to a $V_{DD\text{-}SENSE}$ terminal of latch 454, and a second terminal of second transistor 476 is coupled to ground. An input of inverter 478 is coupled to the first terminals of first and second transistors 474 and 476. An output of inverter 478 is coupled to a gate terminal of second transistor 476. A gate terminal of first transistor 474 is coupled to receive a bias voltage BIAS.

It is appreciated that example latch 454 illustrated in FIG. 4 is implemented with a current-starved bit-keeper. In one example, an event is detected when the output of inverter 478 turns on the NMOS second transistor 476, which causes an event current $I_{EVENT}$ 480 to flow through the first transistor 474 and second transistor 476 as shown. Latch 454 can therefore be sensed through the $V_{DD\text{-}SENSE}$ terminal and/or via the event current $I_{EVENT}$ 480. With the gate of the first transistor 474 tied to the bias voltage BIAS, the event current $I_{EVENT}$ 480 is a distinct current consumption (e.g., a unit current) that is conducted through latch 454 in response to the event being detected in event driven pixel circuit 404. In one example, the event current $I_{EVENT}$ 480 is conducted through latch 454 if and only if an event is detected in event driven pixel circuit 404.

In an example implementation in which the event sensing system includes a global activity monitor (e.g., activity monitor 122 of FIG. 1) or a row/column-wise activity monitor (e.g., row readout 208), the current-starved bit-keeper implemented in latch 454 is configured to generate the unit current per pixel event current $I_{EVENT}$ 480 if an event is detected and then stored in latch 454. These currents in the event sensing system (e.g., event sensing system 100) that are generated by all of the event driven pixel circuits 404 if and only if events are detected may be added up or summed on a row or global level by tying together the supply nodes and feeding them to a discriminating circuit (e.g., activity monitor 122). In various examples, this discriminating circuit compares the row or global activity against reference levels. The activity monitor (e.g., activity monitor 122) may then provide a digital signal to the event filtering periphery. In the various examples, events may be filtered accordingly when excess activity is detected.

As mentioned, the gate of the PMOS transistor 474 is tied to the bias voltage BIAS, which in one example can be generated from a diode connected PMOS to set the predetermined or reference unit current value for event current $I_{EVENT}$ 480. In the depicted example, the event current $I_{EVENT}$ 480 is illustrated to be sensed by the positive supply rail or the $V_{DD\text{-}SENSE}$ terminal. It is appreciated that the reference unit current for event current $I_{EVENT}$ 480 of event driven pixel circuit 404 detecting an event is generated within latch 454. In addition, with the gate of PMOS transistor 474 tied to the bias voltage BIAS, PMOS transistor 474 is configured as an active load that is operated such as to not fully switch OFF, which allows the distinct current consumption of event current $I_{EVENT}$ 480 if and only if the inverter 478 or latch 454 is activated in response to the detection of an event by event driven pixel circuit 404.

In alternative implementations, it is appreciated that the event current may be sensed on the negative rail. In addition, in an alternative implementation, the reference level may be set by current-starving the NMOS transistor 476 with a bias voltage rather than the PMOS transistor 474 as shown in FIG. 4. In other examples, if distributing the reference potential is a bottleneck, an "approximate unit current" may be generated by using, for example, a diode connected transistor as a load instead of the current-starved transistor as shown in FIG. 4.

In summary, it is therefore appreciated that an event vision sensor or an event sensing system is disclosed herein, which incorporates an event filtering mechanism to avoid congestion at excess event rates. The disclosed mechanism employs a randomly generated mask to select which events are to be filtered out, which therefore helps to avoid static artifacts. In various examples, the event sensing system may include a row readout circuit that detects if at least one pixel in a row detected an event. The detection may for example be performed with an open drain readout. The output signals from the event driven pixels of an entire row the pixel array may then be optionally copied to a line buffer and the randomly generated filtering mask may then be applied to the line buffer to randomly filter the events to reduce congestion. In the various examples, the random mask has a multitude of programmable filtering ratios which are selected from based on an event activity measure.

The activity measure may be derived from a global and/or or row/column-wise activity monitor or a combination thereof. The global activity monitor may be implemented in a way such that every event driven pixel generates a distinct current consumption on a reference supply if and only if an event is detected. The total sum of the distinct current consumption of the pixels may be measured on the reference supply by an analog to digital converter.

The reference current of the event driven pixel detecting an event is generated within a latch. In various examples, one of the cross-coupled inverters included in the latch incorporates an active load operated such as to not fully switch OFF the inverter cross-current but to allow the distinct current consumption if and only if said inverter is activated by means of a detected event. A local row or block-wise activity measure is derived from the line buffer by using for example adders or unit current generation and analog to digital conversion.

In the various examples, the random masks may be generated with a linear feedback shift register in a way to generate a pseudorandom filtering mask. The filtering mask may have the length of the column count of the pixel array in order to provide a truly random filtering or alternatively of a length shorter than the column count of the pixel array in order to allow for eased implementation. The shorter filtering mask may be either generated locally per block to be filtered or globally. The globally generated filtering mask may be repeated or copied or applied to all blocks to be filtered.

In the various examples, a combination of row/column and global activity monitor may be implemented in a way such that events are filtered if and only if both global and row/column activity monitors detect an excess activity.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An event sensing system, comprising:
   a pixel array including a plurality of event driven pixel circuits, wherein the pixel array is configured to be illuminated by incident light, wherein each one of the event driven pixel circuits is configured to generate an event current in response to a detection of an event in the incident light;
   a line buffer coupled to the pixel array, wherein output signals of a row of the pixel array are configured to be read out from the row of the pixel array to the line buffer in response to the detection of the event in the incident light;
   a random number generator configured to randomly generate a filtering mask according to a drop rate; and
   a mask circuit coupled to the line buffer to receive the output signals of the row of the pixel array, wherein the mask circuit is further coupled to the random number generator to receive the filtering mask, wherein the mask circuit is configured to filter the output signals of the row of the pixel array in response to the filtering mask.

2. The event sensing system of claim 1, further comprising a filtered line buffer coupled to the mask circuit to receive filtered output signals from the mask circuit.

3. The event sensing system of claim 1, wherein the random number generator comprises a linear feedback shift register.

4. The event sensing system of claim 1, wherein the random number generator is a programmable random number generator configured to provide the filtering mask with a multitude of different programmable filtering ratios in response to the drop rate.

5. The event sensing system of claim 4, further comprising a drop rate register coupled to the random number generator, wherein the random number generator is coupled to receive the drop rate from the drop rate register.

6. The event sensing system of claim 4, wherein the random number generator is further configured to provide the filtering mask with the multitude of different programmable filtering ratios in response to an activity monitor signal.

7. The event sensing system of claim 6, further comprising an activity monitor coupled to the plurality of event driven pixel circuits of the pixel array, wherein the activity monitor is configured to generate the activity monitor signal in response to the event current generated by each one of the plurality of event driven pixel circuits of the pixel array.

8. The event sensing system of claim 7, wherein the activity monitor comprises an analog to digital converter.

9. The event sensing system of claim 7, wherein the activity monitor comprises:
   a current mirror including a first transistor coupled to a second transistor, wherein a gate of the first transistor is coupled to a gate and a source of the second transistor, wherein a drain of the first transistor and a drain of the second transistor are coupled to a supply voltage, wherein the source of the second transistor is coupled to each one of the plurality of event driven pixel circuits;
   a voltage divider including a plurality of series-coupled resistors coupled to a source of the first transistor; and
   a plurality of comparators coupled to the voltage divider, wherein each one of the plurality of comparators is coupled to a respective one of the plurality of series-coupled resistors and a respective reference voltage, wherein the activity monitor signal is generated in response to outputs of the plurality of comparators.

10. The event sensing system of claim 6, further comprising an adder tree circuit coupled to the line buffer, wherein the adder tree circuit is configured to sample information in the line buffer to generate the activity monitor signal in response to events detected in the output signals of the row of the pixel array in the line buffer.

11. The event sensing system of claim 10, further comprising a row readout circuit coupled to the pixel array, wherein the row readout circuit is configured to detect whether at least one of the event driven pixel circuits in a row of the pixel array has detected an event.

12. The event sensing system of claim 1, wherein each one of the event driven pixel circuits comprises:
   a photodiode configured to photogenerate charge in response to incident light from an external scene;
   a logarithmic amplifier coupled to the photodiode to convert photocurrent generated by the photodiode to a voltage output;
   a difference detecting amplifier coupled to the logarithmic amplifier to compare a momentary log-intensity of the voltage output of the logarithmic amplifier with a reference level based on a reset condition or a last event;
   event generating comparators coupled to the difference detecting amplifier to compare an output of the difference detecting amplifier with first and second thresholds to asynchronously detect events that occur in the external scene in response to the incident light; and a latch coupled to the event generating comparators to store events detected by the event generating comparators.

13. The event sensing system of claim 12, wherein the logarithmic amplifier comprises:
an amplifier having an input coupled to the photodiode; and
a transistor having:
a source coupled to the photodiode and to the input of the amplifier;
a gate coupled to an output of the amplifier; and
a drain coupled to a supply voltage.

14. The event sensing system of claim 12, wherein the difference detecting amplifier comprises:
an amplifier having an input and an output;
a first capacitor coupled between an output of the logarithmic amplifier and the input of the amplifier;
a second capacitor coupled between the input of the amplifier and the output of the amplifier; and
a reset switch coupled between the input of the amplifier and the output of the amplifier.

15. The event sensing system of claim 12, wherein the event generating comparators comprise:
a first comparator having a first input coupled to receive a high threshold value and a second input coupled to receive an output from the difference detecting amplifier; and
a second comparator having a first input coupled to receive a low threshold value and a second input coupled to receive the output from the difference detecting amplifier.

16. The event sensing system of claim 12, wherein the latch comprises:
a first transistor having a first terminal, a second terminal, and a gate, wherein the gate of the first transistor is coupled to a bias voltage, wherein the second terminal of the first transistor is coupled to a sense terminal of the latch;
a second transistor having a first terminal, a second terminal, and a gate, wherein first terminal of the first transistor is coupled to the first terminal of the second transistor, wherein the second terminal of the second transistor is coupled to ground; and
an inverter having an input coupled to the first terminal of the first transistor and the first terminal of the second transistor, wherein the inverter has an output coupled to the gate of the second transistor.

17. The event sensing system of claim 16, wherein an event current is configured to be conducted through the sense terminal of the latch, the first transistor, and the second transistor in response to an event being detected by the event driven pixel circuit.

18. The event sensing system of claim 16, wherein the bias current is configured to prevent the first transistor from being fully turned off such that the event current is a unit current having a predetermined value.

19. A method of filtering events, comprising:
detecting events in incident light with a pixel array including a plurality of event driven pixel circuits;
randomly generating a filtering mask with a random number generator according to a drop rate;
filtering the events detected by the pixel array with the filtering mask to avoid congestion at excess event rates, wherein the randomly generated filtering mask determines which events are filtered to avoid static artifacts.

20. The method of claim 19, further comprising detecting if at least one pixel in a row has detected an event with a row readout circuit.

21. The method of claim 20, further comprising copying output signals of an entire row of the pixel array to a line buffer in response to said detecting if at least one pixel in the row has detected the event with the row readout circuit.

22. The method of claim 19, further comprising selecting from a multitude of programmable filtering ratios in response to the drop rate to randomly generate the filtering mask.

23. The method of claim 22, further comprising selecting from the multitude of programmable filtering ratios in response to an activity monitor signal to randomly generate the filtering mask.

24. The method of claim 23, further comprising deriving the activity monitor signal from a global activity monitor, a row-wise activity monitor, a column-wise activity monitor, or a combination thereof.

25. The method of claim 23, wherein said detecting events in the incident light with the pixel array including the plurality of event driven pixel circuits comprises generating a unit current with each one of the plurality of event driven pixel circuits in response to detecting an event.

26. The method of claim 25, further comprising generating the activity monitor signal with an analog to digital converter coupled to receive the unit currents from each one of the plurality of event driven pixel circuits that have detected the event.

27. The method of claim 25, further comprising generating the unit current in each one of the plurality of event driven pixel circuits with a latch included in each one of the plurality of event driven pixel circuits.

28. The method of claim 27, further comprising not fully turning off a transistor in the latch included in each one of the plurality of event driven pixel circuits to generate the unit current if and only if an event is detected by each one of the plurality of event driven pixel circuits.

29. The method of claim 25, further comprising generating the activity monitor signal with a local row or block-wise activity measure derived from a line buffer configured to store output signals from a row of the pixel array in response to said detecting if at least one pixel in the row has detected the event with the row readout circuit.

30. The method of claim 19, wherein said randomly generating the filtering mask with the random number generator comprises randomly generating the filtering mask with a linear feedback shift register.

31. The method of claim 19, wherein the filtering mask has a length equal to a column count of the pixel array.

32. The method of claim 19, wherein the filtering mask has a length less than a column count of the pixel array.

33. The method of claim 32, wherein the filtering mask with the length less than the column count of the pixel array is generated locally per block to be filtered.

34. The method of claim 32, wherein the filtering mask with the length less than the column count of the pixel array is generated globally, and wherein the globally generated filtering mask is configured to be applied to all blocks to be filtered.

35. The method of claim 19, wherein the filtering of the events detected by the pixel array with the filtering mask to avoid congestion at excess event rates is performed if and only if both global and row/column activity monitors detect an excess activity.

* * * * *